Jan. 12, 1965  C. B. FISCHBACH  3,165,089
REMINDER DEVICE
Filed Feb. 25, 1963
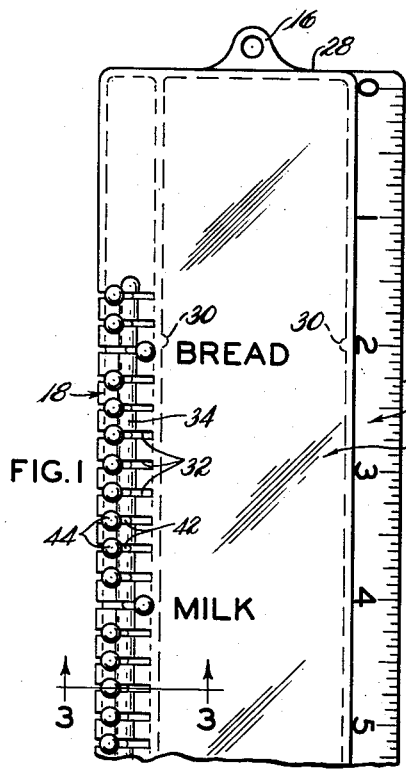
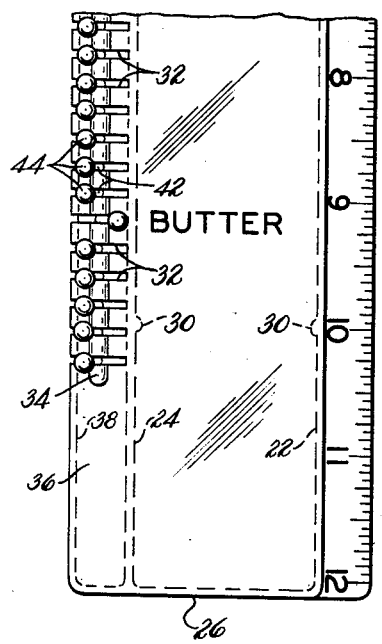
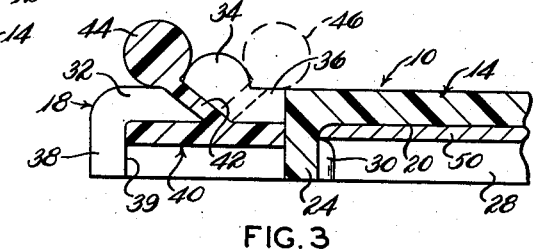
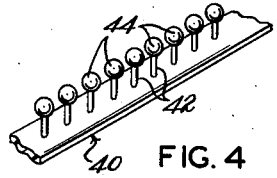
INVENTOR.
CECIL B. FISCHBACH
BY
Oldham & Oldham
ATTYS.

United States Patent Office 3,165,089
Patented Jan. 12, 1965

3,165,089
REMINDER DEVICE
Cecil B. Fischbach, 914 Copley Road, Akron, Ohio
Filed Feb. 25, 1963, Ser. No. 260,408
4 Claims. (Cl. 116—134)

This invention relates to a reminder device, and more particularly, to an inventory apparatus which is adapted to be hung by a housewife in a kitchen, carried by a shopper in a store to remind the shopper at a glance what has been purchased, or used for any other inventory or reminder purpose desired.

Heretofore it has been known that housewives make up shopping lists for use when they go to the self-service supermarkets. However, in order for these lists to be effective, the wife must carry a pencil and cross off each item on the list as it is picked up from the shelves and placed into the shopping cart, or must try to remember which items have been purchased and which items have not been purchased. Both of the above stated methods are difficult, and highly inaccurate. The result is that frequently the shopper does not get everything desired, or gets more than desired. Also, a new list must be made out for every shopping occasion, which is time consuming and often not inclusive. Kitchen positioned shopping lists have been provided before but these are often complicated or expensive. Other inventory and/or reminder devices have been proposed which are not adaptable to various situations.

It is the general object of the invention to avoid and overcome the foregoing and other difficulties of and objections to prior art practices by the provisions of a shopping reminder inventory apparatus which contains a complete inventory list with a unique and simple inventory system to indicate which articles are desired, and which articles have been secured, all at a glance, and which requires no other apparatus for operation, and which requires no writing for operation.

Another object of the invention is to provide a reminder or inventory device having all parts, including movable marker portions, of inexpensive plastic.

Another object of the invention is to provide a shopping reminder which is extremely light in weight, easily carried in a person's purse or pocket, and which has an attachment hook so that it can be hung at any suitable location for quick and ready reference.

Another object of the invention is to provide a shopping reminder inventory apparatus or the like which is durable of construction, stylish, highly effective in operation, and low in cost.

Another object of the invention is to provide a shopping reminder inventory system in which the shopping list can be readily and easily changed, and which contains a measuring rule on one side to quickly and conveniently measure any articles desired.

Another object of the invention is the provision of a device as described which is adapted to carry an attractive advertising message and which can be given away as a premium.

The aforesaid objects of the invention, and other objects which will become apparent as the description proceeds, are achieved by providing an inventory device including a one piece body of transparent plastic of substantially rectangular shape, flange means defining a substantially rectangular recess on the back of the body, a card bearing an inventory list received in the recess and viewable through the body, means holding the card in the recess, flange means defining a narrow groove in the back of the body along an edge of the recess, said body having a plurality of slots extending transversely of the groove, each slot being aligned with an item on the inventory list, a raised rib on the top of the body in alignment with the groove and substantially bisecting the slots and cut away at each slot, a plastic strip received in the groove, a plurality of flexible fingers molded integrally with the strip so that each finger extends through a slot, a bead molded integrally at the end of each finger and adapted to be flipped with its finger to resiliently position the bead at one side or the other of the rib to thereby mark an item on the inventory list.

For a better understanding of the invention reference should be had to the accompanying drawings, wherein:

FIGURE 1 is a front foreshortened elevational view of one embodiment of the invention;

FIGURE 2 is an end view of the apparatus of FIGURE 1;

FIGURE 3 is an enlarged horizontal fragmentary cross sectional view taken on the line 3—3 of FIGURE 1; and FIGURE 4 is a fragmentary perspective view of the plastic marker strip only showing the fingers and beaded tips thereon.

With specific reference to the form of the invention illustrated in the drawings, the numeral 10 indicates generally a shopping reminder incorporating the principles of the invention and made in the form of a flatly hollow transparent plastic plate or body, generally being formed in single molding operation, and comprising a measuring rule 12, a central portion 14 hollow at its back, a supporting hook 16, and an inventory system denoted generally by the numeral 18.

As more clearly seen in FIGURE 2, the measuring rule 12 comes to a tapered edge similar to a standard ruler edge. The central portion 14 is much thicker than the measuring rule 12, and contains an indented recess 20. The recess 20 extends the length of the body and is bounded by integral flanges or walls 22 and 24 on the sides and 26 and 28 on the bottom and top ends respectively. A plurality (for example, four) of protuberances or nipples 30 are molded on the side walls 22 and 24 to hold an inventory card 50 in position as will be more fully explained later. The relationship of the nipples 30 is more clearly shown by dotted lines in FIGURE 1.

The inventory section 18 comprises an integrally molded channel section formed with a plurality of narrow solts 32 directed perpendicular to the longitudinal length of the body 10. An integral raised substantially half round rib 34 is provided which runs perpendicular to the slots 32 and parallel to the longitudinal edge of the inventory section 18, which rib extends between every slot to essentially bisect the length of the slots. With specific reference to FIGURE 3, the relationship between the raised rib 34 and the slots can be more clearly seen.

As seen in FIGURE 3 the inventory section 18 is bounded on the inside by side wall 24, on the top by a top plate 36 containing the integral raised rib 34, and on the outer edge by wall 38. Therefore, a recess 39, bounded by walls 24 and 38, is formed to receive a plastic strip having elastic properties, and denoted generally by the numeral 40. The strip 40 contains a plurality of fingers 42 molded integrally therewith, and with each finger having a rounded bead or tip 44 also molded integrally therewith. The strip 40 is made to fit snugly in the recess 39 in the inventory section 18. The strip 40 is held in place in the recess 39 by inserting the fingers 42 into each corresponding slot 32 and snapping or resiliently moving the strip into position as indicated in FIGURE 3.

When the strip 40 is positioned as shown in FIGURE 3, each finger 42 is slightly stretched by engagement of its bead 44 with the rib 34 so that the strip 40 is held in position. Note, again in FIGURE 3, how the beads 44 rest between the top plate 36 and the raised rib 34. There is enough elasticity in each finger section 42 so that the finger and the bead 44 thereof may be moved by hand to the opposite side of the raised rib 34, as indicated at 46, in FIGURE 3, by the dotted lines. Therefore, with the strip 40 positioned as shown in FIGURE 3, the beads 44 and fingers 42 can be quickly moved or flipped to either side of the raised rib 34, as desired, and once moved are resiliently held in the new position.

The card 50 is of paper or plastic and is normally printed in bright colors which show clearly through the clear plastic 14. The top of the card can contain an advertising message, a store name, or the like, and the body of the card bears an appropriate or desired inventory list only certain of which are shown in FIGURE 1 by way of illustration. The card 50 is normally pressed into the recess 20 in the back of the body 10 and is held in position by the nipples 30. However, the invention contemplates printing the inventory list and advertising directly into the recess 20, as will be understood. Also, the invention contemplates the use of a pressure sensitive adhesive means to hold the card 50 in position in the recess 20.

The use of the device is substantially self-explanatory, particularly when used only in the kitchen as a shopping reminder. When so used a housewife can flip the bead 44 of any desired finger 42 from the left to the right of the rib 34 to mark any desired item for purchase. The finger 42 stretches sufficiently during this flipping operation to allow the movement of the bead 44 to the new position and with the bead then being held resiliently in the new position.

Now if the housewife elects to take the device along to the supermarket for use in actual shopping she may do so. Assuming, as illustrated, the shopping remainder shown in FIGURE 1 is set up to buy bread, milk, coffee, and butter at the store desired. The remainder may be hung on or laid in the shopping cart in the store. Then, as each item is picked up the bead 44 marking the item is moved back to the left side, all as viewed in FIGURE 1, to indicate that the article desired has been purchased, and to readily show when all items have been obtained. Therefore, when a shopper has completed shopping, the shopping remainder should have all the beads 44 back in the left hand column where they were originally to indicate that all items desired have been obtained.

The measuring rule 12 can be used during the shopping process or at home to measure any items desired to determine if they are of the desired size, if they will fit in the shelf space at home, or for any other desired purpose.

Therefore, it will be recognized that the objects of the invention have been achieved by providing a simple, durable, inexpensive all plastic shopping remainder utilizing a readably marked inventory system, and characterized by attractiveness, and ability to bear an advertising message or store name. It is to be particularly noted that by simple changing the list the device can be used as an inventory or remainder means for practically any purpose.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a quick inventory apparatus the combination of
   a flat rectangularly shaped plate having an elongated rectangularly shaped recessed portion in one face thereof extending substantially parallel and adjacent to one edge thereof, said edge having a plurality of equally spaced open slots therealong substantially perpendicular to the edge and extending inwardly across the width of the recessed portion,
   a raised half-round rib interposed substantially at the center of the length between adjacent slots to define inventory indicating positions on both sides thereof,
   a long plastic strip having elastic qualities removably received in said recessed portion of said plate,
   a plurality of elastic fingers integrally formed with the strip extending outwardly therefrom so that each finger is received through a respective slot in the plate, and
   a bead integrally formed at the outward extension of each of said fingers proportioned so as to cause a continuous tensioning on its respective finger to urge said plastic strip into position when said bead is in either indicating position with respect to said raised rib.

2. A quick inventory apparatus according to claim 1 wherein the raised half-round rib is raised from the surface of the plate approximately one half the diameter of the beads so that the bead may be readily flipped with its finger to resiliently position the bead at one side or the other of the rib.

3. In a quick inventory apparatus the combination of
   a flat rectangularly shaped plate having an elongated recessed portion in one face thereof extending substantially parallel and adjacent to one edge of the plate, said one edge having a plurality of equally spaced slots therealong open at the edge and substantially perpendicular to the edge extending inwardly across the width of the recessed portion,
   a long plastic strip having elastic qualities removably received in said recessed portion of said plate,
   a plurality of elastic fingers integrally formed with the strip extending outwardly therefrom so that each finger is received through a respective slot in the plate,
   a bead having a width greater than the width of the slots integrally formed at the outward extension of each of said fingers, and
   a raised half-round rib interposed between adjacent slots to define inventory indicating positions on both sides thereof and proportioned so as to cause a continuous tensioning on each of said fingers to urge said plastic strip into position when said bead is in either indicating position with respect to said raised rib.

4. A quick inventory apparatus according to claim 3 where an inventory list is removably attached to the plate so that each slot is aligned with an item on the inventory list, and wherein the bead integrally formed at the end of each finger is substantially twice the height of the raised rib so that it may be flipped with its finger to resiliently position the bead at one side or the other of the rib to thereby mark an item on the inventory list.

References Cited in the file of this patent

UNITED STATES PATENTS

| | | |
|---|---|---|
| 936,277 | Kilmer et al. | Oct. 5, 1909 |
| 1,313,377 | Hassel | Aug. 19, 1919 |
| 2,660,145 | Odias | Nov. 24, 1953 |
| 2,744,490 | Evanoff | May 8, 1956 |